United States Patent
Walusayi

(10) Patent No.: US 12,273,246 B2
(45) Date of Patent: Apr. 8, 2025

(54) 3D COLLABORATIVE VISUAL COMMAND LINE SYSTEM TO VISUALIZE AND MANAGE NETWORKED ENDPOINTS

(71) Applicant: DatavizVR Incorporated, Austin, TX (US)

(72) Inventor: Wallon Walusayi, Austin, TX (US)

( * ) Notice: Subject to any disclaimer, the term of this patent is extended or adjusted under 35 U.S.C. 154(b) by 0 days.

(21) Appl. No.: 17/913,779

(22) PCT Filed: Mar. 26, 2021

(86) PCT No.: PCT/US2021/024518
§ 371 (c)(1),
(2) Date: Sep. 22, 2022

(87) PCT Pub. No.: WO2021/195585
PCT Pub. Date: Sep. 30, 2021

(65) Prior Publication Data
US 2024/0048465 A1    Feb. 8, 2024

Related U.S. Application Data

(60) Provisional application No. 63/001,181, filed on Mar. 27, 2020.

(51) Int. Cl.
*H04L 43/045* (2022.01)
*H04L 43/062* (2022.01)
*H04N 23/695* (2023.01)

(52) U.S. Cl.
CPC .......... *H04L 43/045* (2013.01); *H04L 43/062* (2013.01); *H04N 23/695* (2023.01)

(58) Field of Classification Search
CPC . H04L 43/045; H04L 43/062; H04L 41/0806; H04L 41/12; H04L 41/14; H04L 41/40; H04L 43/0876; H04L 43/20; H04L 41/22; H04N 23/695; G06F 9/543; G06F 2209/545
See application file for complete search history.

(56) References Cited

U.S. PATENT DOCUMENTS

2011/0029893 A1    2/2011  Roberts et al.
2013/0295954 A1*  11/2013  Hamalainen .......... H04W 40/20
                                                      455/456.1
(Continued)

OTHER PUBLICATIONS

International Search Report and Written Opinion for PCT/US2021/024518 dated Jun. 11, 2021, 9 pages.

*Primary Examiner* — Farzana B Huq

(57) ABSTRACT

The system includes one or more virtual machines deployed on a network and connected to a server via one or more networks. Each virtual machine obtains and analyzes network traffic and constructs a local network map of devices based on the analysis. Information corresponding to the local network map of devices is provided to the server and the network server aggregates one or more local network maps of devices into a global network map of devices. The global network map of devices is constructed into 2D and 3D graphical user interfaces by the server. The characteristics of user devices that request the global network map of devices from the server are obtained by the server and analyzed and in response to the request, the server provides an appropriate 2D or 3D graphical user interface to the requesting device.

19 Claims, 11 Drawing Sheets

(56) References Cited

U.S. PATENT DOCUMENTS

| | | | |
|---|---|---|---|
| 2013/0339423 A1* | 12/2013 | Degtiarov | G06F 9/5072 |
| | | | 709/203 |
| 2014/0106877 A1* | 4/2014 | Knutsson | A63F 13/46 |
| | | | 463/31 |
| 2016/0197968 A1 | 7/2016 | Vasudevan et al. | |
| 2016/0224117 A1* | 8/2016 | Braun | G06F 3/03543 |
| 2016/0286349 A1 | 9/2016 | Borghei | |
| 2017/0195424 A1 | 7/2017 | Nasir et al. | |
| 2020/0044940 A1 | 2/2020 | Thomasson et al. | |
| 2022/0129064 A1* | 4/2022 | Gueye | G06Q 50/01 |

\* cited by examiner

3D COLLABORATIVE VISUAL COMMAND LINE SYSTEM TO VISUALIZE AND MANAGE NETWORKED ENDPOINTS

BACKGROUND

Field of the Invention

The present disclosure is generally related to network management and more particularly related to management of networked Internet of Things ("IoT") devices and corresponding data flow and connectivity and security.

Related Art

Management of endpoint devices in the IoT paradigm presents significant challenges that are not met by conventional network management solutions. Conventional systems provide 2D user interfaces that are incapable of providing users with a comprehensive view of network topology and the health and analytics of the endpoints that form the network topology. Therefore, what is needed is a system and method that overcomes these significant problems found in the conventional systems as described above.

SUMMARY

Accordingly, explained herein is a system that solves the problems described above and provides a comprehensive 3D network topology map of deployed devices that is unable to be provided via a conventional 2D interface. The system also allows for collaboration by network managers to more effectively manage the various endpoint devices in the network and the data flow between devices and the connectivity of individual devices.

The system includes one or more virtual machines deployed on a network and connected to a server via one or more networks. Each virtual machine obtains network traffic from its local environment and analyzes the network traffic and constructs a local network map of devices based on the analysis. Information corresponding to the local network map of devices is provided to the server and the network server aggregates one or more local network maps of devices into a global network map of devices. The global network map of devices is constructed into 2D and 3D graphical user interfaces by the server. The characteristics of user devices that request the global network map of devices from the server are obtained by the server and analyzed and in response to the request, the server provides an appropriate 2D or 3D graphical user interface to the requesting device.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Embodiments described herein provide for a system for collaborative visualization and management of networked endpoints using an aggregate global network map of endpoint devices that can be simultaneously viewed in both 2D and 3D interfaces. For example, one method disclosed herein allows for one or more of virtual machines to be deployed on one or more networks. The virtual machines monitor network data traffic and build a local map of networked devices. The local maps are sent to a server and aggregated into global map. The global map is constructed into a data structure that can be provided to user devices for viewing in a 2D or 3D graphical user interface, depending on the user device capabilities. End users can therefore collaborate in management of the devices in the global map of networked devices using both 2D and 3D interfaces.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. System Overview 1.1. Infrastructure

Figure 1:
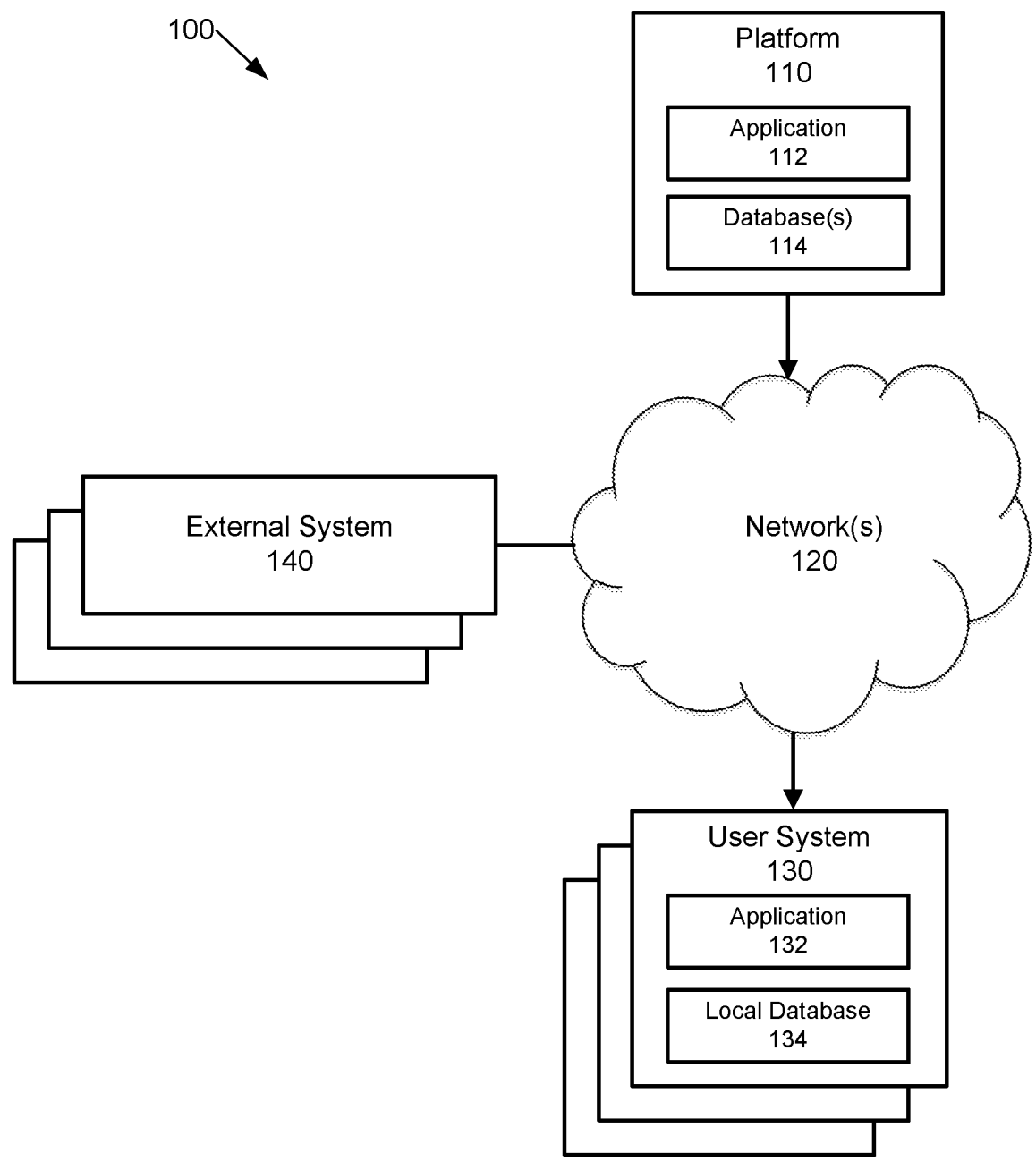
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, head mounted displays, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™' Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

1.2. Example Processing Device

Figure 2:
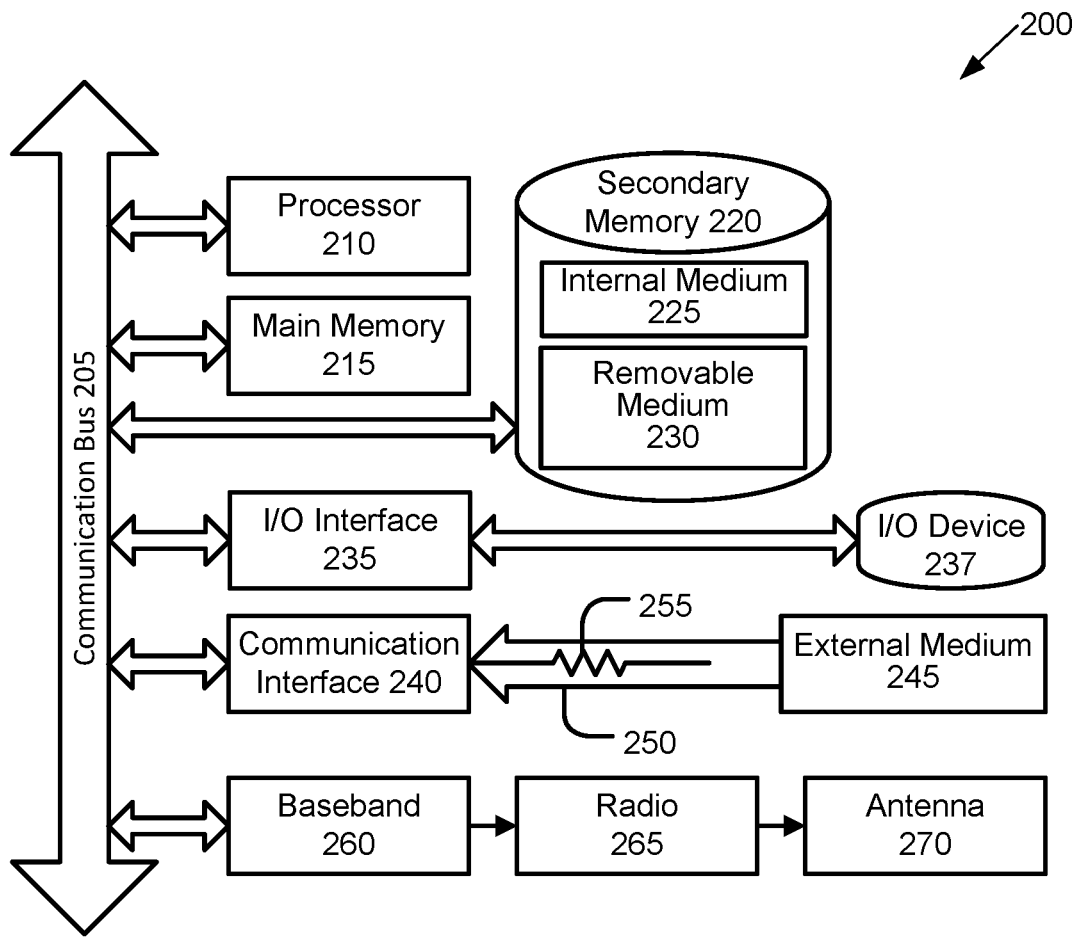
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices 237. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device 237 may be combined, such as in the case of a touch panel display (e.g., in a smartphone, tablet, or other mobile device).

In an embodiment, the I/O device 237 may be any type of external or integrated display and may include one or more discrete displays that in aggregate form the I/O device 237. The I/O device 237 may be capable of 2D or 3D presentation of visual information to a user of the system 200. In one embodiment, the I/O device 237 may be a virtual reality or augmented reality device in the form of a headset worn by the user so the user may visualize the presentation of information in 3D.

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Example Operational Environment

Figure 3:
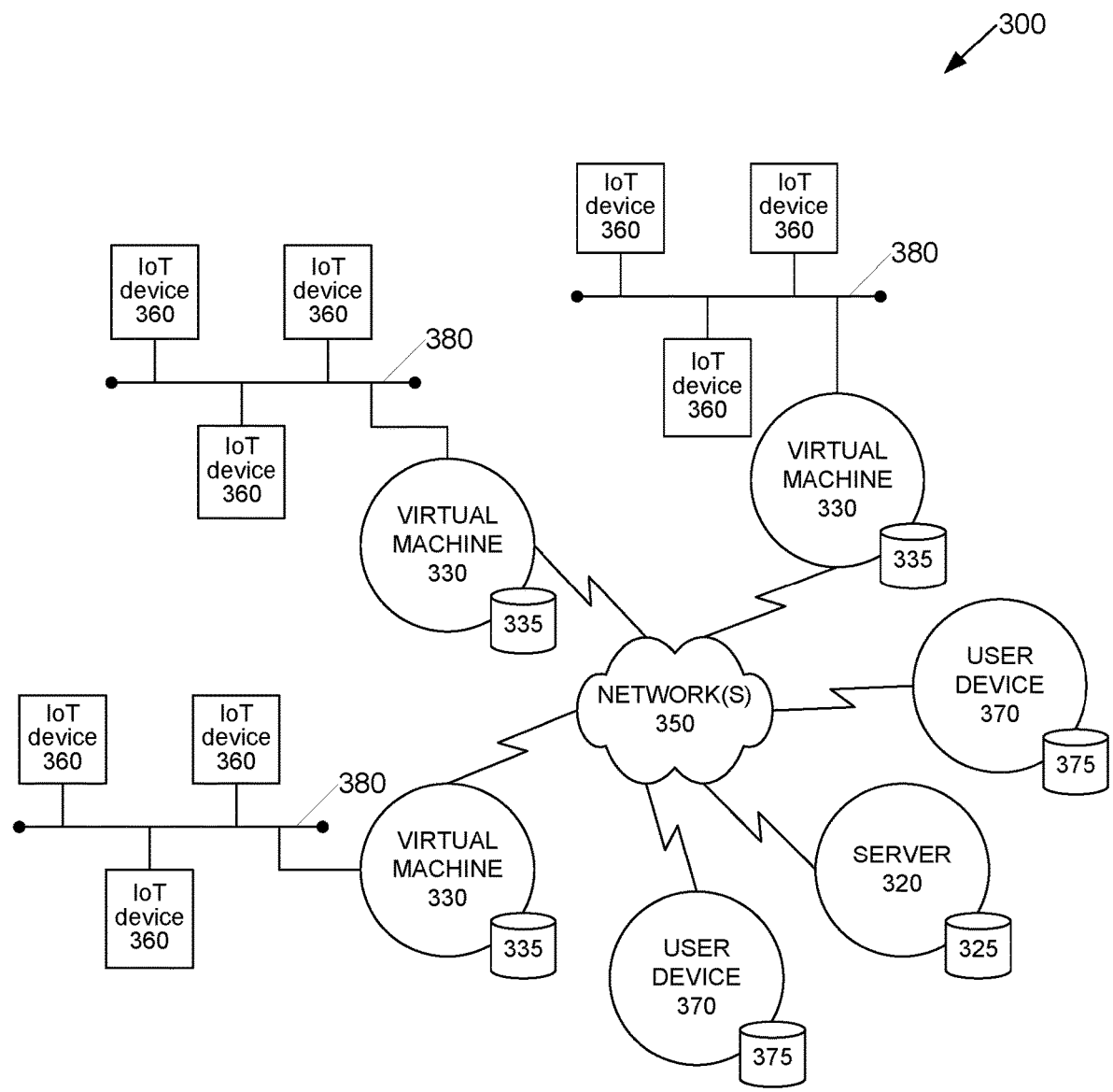
FIG. 3 illustrates an example system for a 3D collaborative visual command line system according to an embodiment.

FIG. 3 is a network diagram illustrating an example system 300 for a 3D collaborative visual command line system according to an embodiment. In the illustrated embodiment, the system 300 includes at least one server 320 (e.g., platform 110 from FIG. 1) having a data storage area 325. The server 320 is communicatively coupled to at least one data communication network 350 (e.g., network 120 from FIG. 1) and is configured for data communication with one or more virtual machines 330 (e.g., external device 140 from FIG. 1) and one or more user devices 370 (e.g., user system 130 from FIG. 1) via the at least one network 350. The physical device employed to implement any of the server 320, the device running the virtual machine 330, or the user device 370 may be any type of processor enabled device capable of data communication over a wired or wireless network as previously described with respect to FIG. 2.

Each virtual machine 330 runs on a device that includes a data storage area 335 and each virtual machine is connected to at least one network 380 that communicatively couples one or more endpoint devices 360. The virtual machine 330 is configured to receive an analyze data traffic from the network 380 and generate a local map of endpoint devices 360 that are communicating over the network 380. For example, in one embodiment the virtual machine receives data from a packet sniffer connected to network 380 and analyzes the data packets to identify endpoint devices 360 that are communicating over the network 380. The virtual machine 330 uses the analysis of the data packets to generate a local network map of endpoint devices 360 and data flow information and provides this information to the server 330 on a periodic and/or continuous basis.

The server 320 receives information from a plurality of virtual machines 330 and uses the information to generate a global network map including network topology information and location information about endpoint devices 360 and global network data flow information. Advantageously, the global data map generated by the server 320 is configured to be accessed by 2D capable or 3D capable user devices 370.

A 2D user device 370 may be any type of user access device such as a desktop computer, personal computer, laptop, mobile device, cell phone, tablet device, and the like that includes a 2D graphical user interface such as an external or integrated display device. A 3D user device 370 may be any type of virtual reality or augmented reality device that includes a 3D graphical user interface such as an integrated headset, goggles, or glasses.

The server 320 is also configured to receive requests from one or more user devices 370 and analyze each request to determine one of more characteristics of each requesting end user device 370. In one embodiment, the analysis by the server 320 of the characteristics of a requesting user device 370 determines whether the particular user device 370 is capable of providing a 2D or 3D graphical user interface to a user. Based on this analysis, if the user device 370 is capable of providing a 3D graphical user interface to the user, the server 320 provides a 3D graphical user interface of at least a portion of the global network map including network topology and location of endpoint devices 360 and global network data flow information. If the user device 370 is not capable of provide a 3D graphical user interface to the user, the server 320 provides a 2D graphical user of at least a portion of the global network map including network topology and location of endpoint devices 360 and global network data flow information. Advantageously, this allows users experiencing a 3D graphical user interface of the global network map to collaborate with users experience a 2D graphical user interface of the global network map in order to more effectively manage the global network and the endpoint devices 360 connected to the global network and the flow of data across the global network.

In one embodiment, a user may initially have a 2D user interface, for example when using a personal computer, and then transition into a 3D user interface by putting on a headset having a wired or wireless connection to the computer. In such an embodiment, the person computer provides the 3D graphical user interface information to the headset and provides the 2D graphical user interface to the display of the personal computer.

Figures 4A, 4B, 4C:
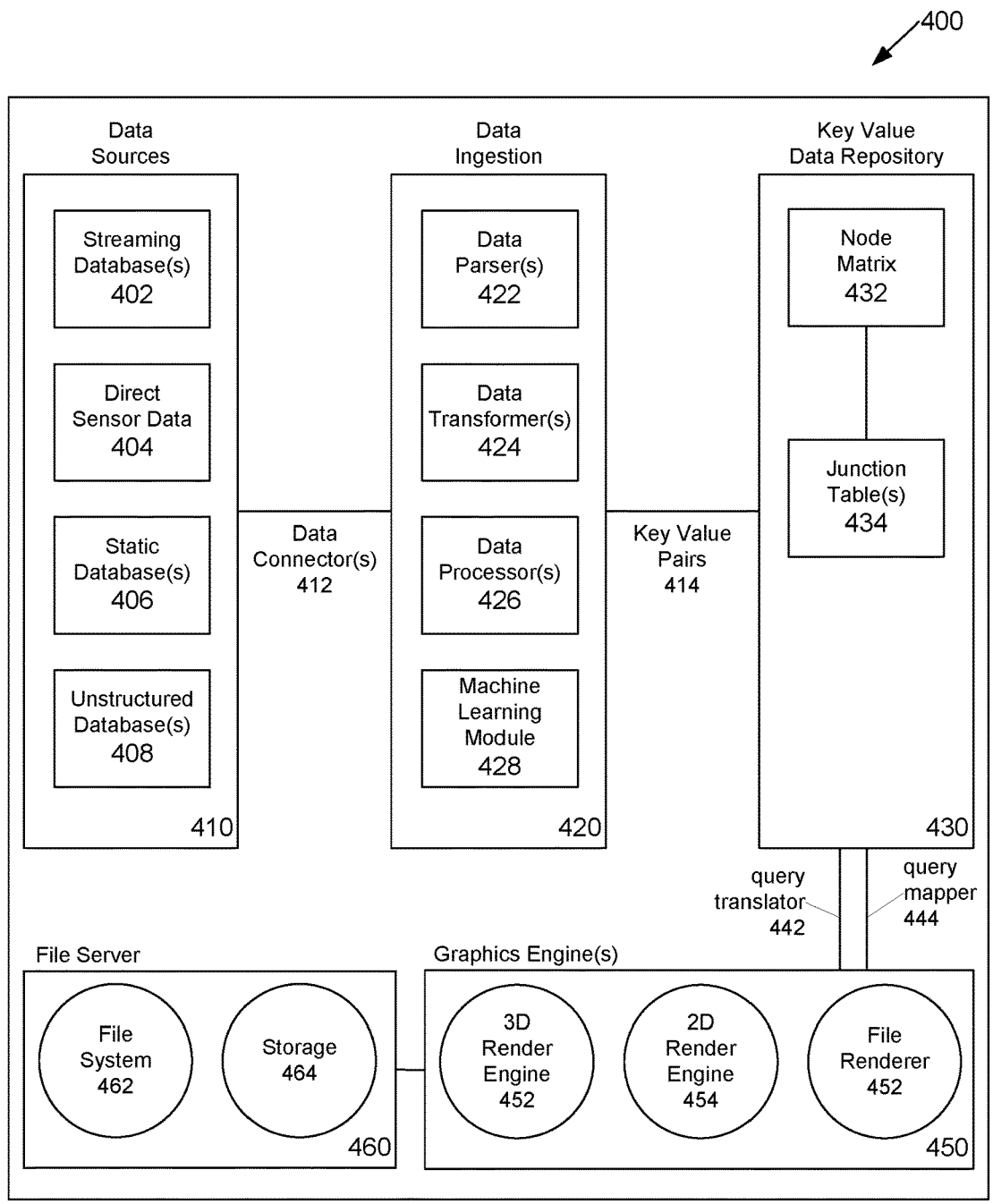
FIG. 4A illustrates an example server system according to an embodiment of the invention.
FIG. 4B illustrates an example node matrix according to an embodiment of the invention.
FIG. 4C illustrates an example junction table according to an embodiment of the invention.

FIG. 4A is a diagram illustrating an example Web Server System 400 for a Data Source 410, Data Ingestion 420, Key-Value Data Repository 430, File Server 460, and Graphics Engine 450 creating a unified 2D/3D Data Pipeline. Updates are streamed to Data Sources 410, which may include but are not limited to one or more Streaming Database(s) 402, Direct Sensor Data 404, Static Databases 406, and Unstructured Database(s) 408.

The Data Sources are connected to the Data Ingestion 420 component, for example using one or more generic or unique Data Connector(s) 412. The Data is ingested using one or multiple Data Parser(s) 422 and normalized using one or multiple Data Transformers 424 and processed using one or multiple Data Processor(s) 426. After being processed, the data may be run through a Machine Learning module 428, for example, one or more of a Syntactic pattern recognition, Correlation Clustering Algorithm, Cluster Analysis Algorithm, and a Similarity Measurement Algorithm, just to name a few.

The data is sent in the form of Kay Value Pairs 414 to the Key Value Data Repository 430 and stored in a Node Matrix 432. The Node Matrix 432 is configured to store data representing a graph into a multi-table and multi valued node based matrix where a local property containing at least one adjacent node can be mapped and recorded based on multi-valued field parameters and referenced by Node ID to one or multiple Junction Tables 434 allowing data query traversal from the first node and may convert the data query into a structured query language (SQL) over one or many tables retrieving multi-node data properties from multiple tables. Additionally, Junction Tables 434 can map two or more tables together by referencing the primary keys of each table which allows for nodes to be connected in a many-to-one relationship from one or more junction tables to one or more data tables.

The indexing and searching is handled by the Query Translator 442 and the Query Mapper 444 rendering queried data using one or more Graphics Engines 450 creating one or more visual graphics for the end user. The Graphics Engines 450 may include, for example, one or more of a 3D Render Engine 452, 2D Render Engine 454 and a File Renderer 456 that may be directly or indirectly linked to a File Server 460 including, for example, a File System 462 and Storage 464 allowing for real-time file retrieval and visualization.

FIG. 4B is an example of a node matrix 432 and FIG. 4C is an example of a junction table 434. The node matrix 432 is communicatively coupled with the junction table 434. In the example, the node matrix 432 has 5 node and includes the node identifier, name, and client information for each node. The junction table 434 includes the node identifier and the sink information for each node.

Figure 5:
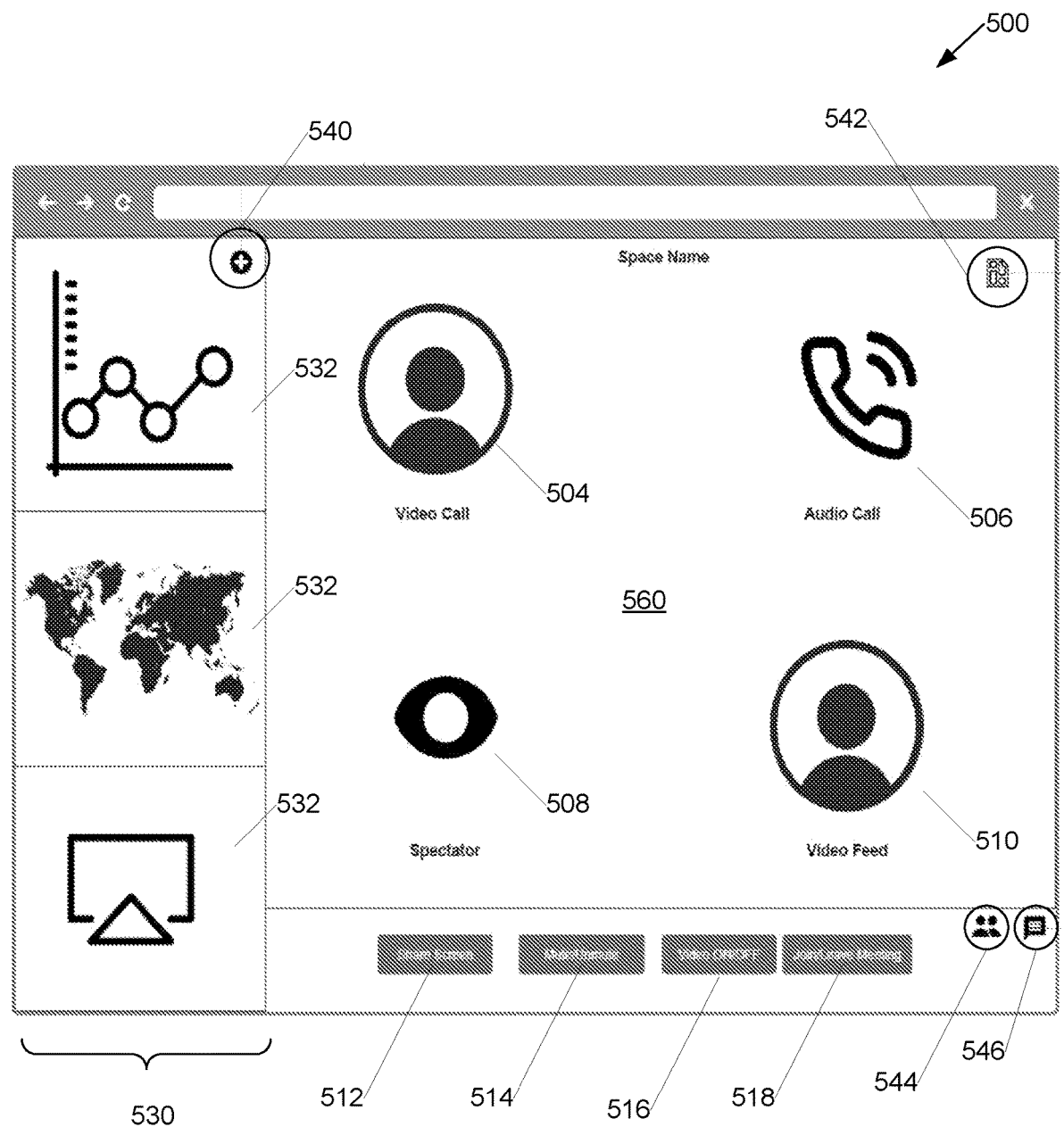
FIG. 5 illustrates an example 2D graphical user interface according to an embodiment of the invention.

FIG. 5 illustrates an example 2D graphical user interface 500. The graphical user interface 500 is shown when users join the network from, for example, a desktop computer, laptop computer, touchscreen device, or mobile device. The 2D graphical user interface 500 displays synchronized information in a real-time Collaboration Space 560, which displays, for example, data in the form of one or more Data Tile(s) 532. In one embodiment, data tiles 532 may include one or a plurality of two or more dimensional graphs, two or more dimensional graphical models, two or more dimensional historical or real-time data feeds, two or more dimensional maps, two or more dimensional dynamic file structures, two or more dimensional web applications, two or more dimensional historical or real-time video capture from one or more Video Stream(s) Feed, Screen-share, Air-Play, or any wirelessly transmitted media or file type. In one aspect, Data Tile(s) 532 may be displayed to the user in the form of interchangeable and modular templates and layouts aggregated into called Data Panel(s) 530. They may also be presented in the collaboration space 560 such as video call 504, audio call 506, spectator 508, and video feed 510. The 2D graphical user interface may also include features and functionality such as, for example, Screen-share 512, Mute/Unmute 514, Video ON/OFF 516, Join/Leave Meeting 518, Participants 544, Chat 546, and additional collaboration, communication and visualization features and functionality. The user graphical interface may also include File Sharing 540 and the capability to customize and design the layout of the interface 500 using the Template Layout 542 within of the Collaboration Space 560.

The Collaboration Space 560 allows users to join from any device. For example, some ways to join may include joining as a Video Call 504, Audio Call 506, a 2D/3D web-based or local application based Spectator 508 and other forms of collaboration and participation tools. The graphical user interface 500 is provided from the same global network map maintained by the server so a user of a device that presents a 2D graphical user interface can collaborate with a user of a device that presents a 3D graphical user interface so that users may collaborate with each other regardless of the capabilities of their local devices.

Figure 6:
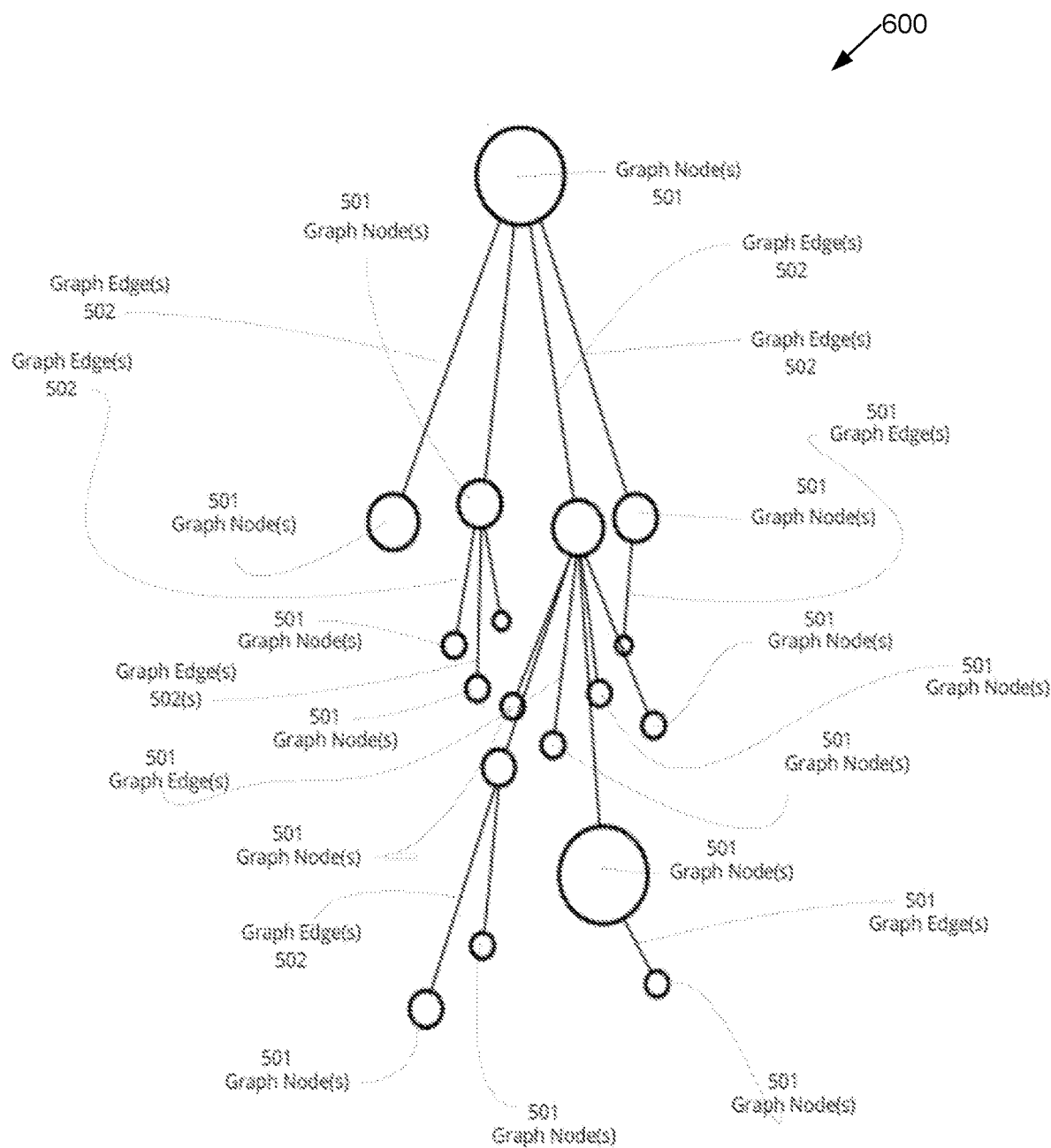
FIG. 6 illustrates an example Network Topology Graph according to an embodiment of the invention.

FIG. 6 illustrates an example Network Topology Graph 600. In one embodiment, the Network Topology Graph 600 can be presented in the Collaboration Space 560 in a 2D environment or a 3D environment. The Network Topology Graph 600 can be, for example, rendered and displayed by the Graphics Engine(s) 450. The Network Topology Graph 600 may include of Graph Node(s) 501 that may, for example, represent IoT device(s) 360 as previously described, and may also represent industrial controllers, access points, switches, routers, servers, applications, cameras, sensors, computer clusters, phones, laptops, desktops, people, aerial vehicles, maritime vehicles, land vehicles, UAV's, weapon systems, spacecrafts, or any similar object or individual. The Graph Node(s) 501 may be connected by zero or more Graph Edge(s) 502 which may represent, for example, a network connection, network strength, network routing, social relationships, network intrusion, metadata connection, image similarities, network relationships, or any similar connection based on proximity or relationship between zero or more Graph Node(s) 501. Each individual Graph Node(s) 501 or Graph Edge(s) 502 can be selected to present additional detailed information and management options in the form of a Control Panel 900 (described in FIG. 9) about the node 501, where the control panel 900 also provides control options for the node 501 within the Collaboration Space 560 in either 2D or 3D. Users can visualize in real-time the Network Topology Graph 600 in either 2D or 3D depending on the capabilities of their local device and synchronously visualize individual node 501 selections and control options using the Control Panel 900. Additionally, the Network Topology Graph 600 can be displayed in either 2D or 3D in the Collaboration Space 560 and accessed via one or more Data Tile(s) 532.

Figure 7:
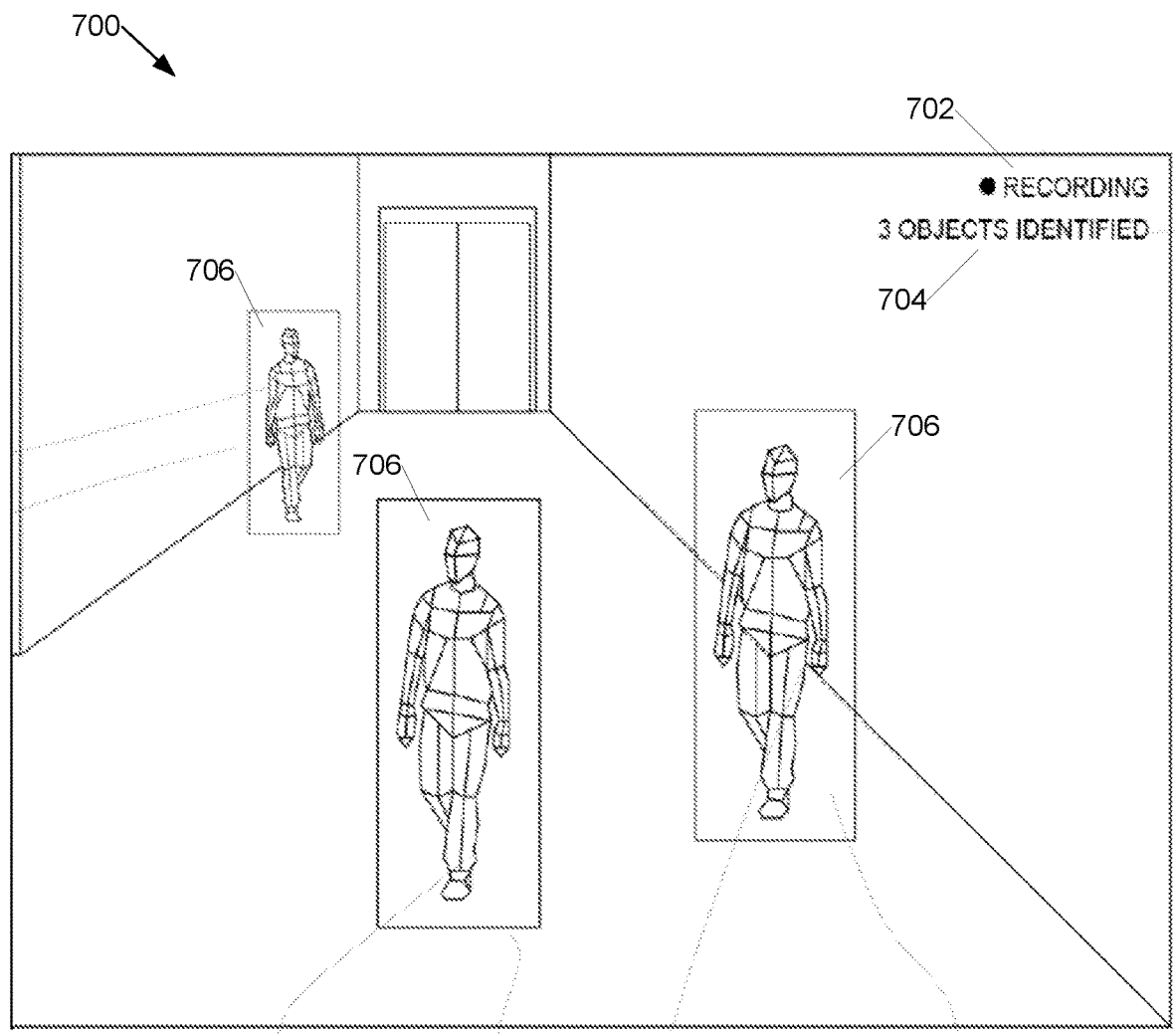
FIG. 7 illustrates an example Video Stream(s) Feed according to an embodiment of the invention.

FIG. 7 illustrates an example Video Stream(s) Feed 700 that, for example, may include one or more security cameras, UAV's, laptop cameras, desktop cameras, cell-phone cameras, watch cameras, virtual reality cameras, CCTV cameras, satellite imagery, IoT cameras, industrial control camera systems or any other camera system(s) or real-time imagery that can be presented in the Collaboration Space 560 in either 2D or 3D. Using a 2D or 3D graphical user interface and the Control Panel 900, a user may select one or more security camera(s) showing a Live Recording 702 or historical video distributed from, for example, one or more of a Streaming Database 402, Direct Sensor Data 404, or other Data Sources 410. The video stream feed 700 may be configured to provide tilting, panning, or zooming in, and collaboratively moving laterally or horizontally in real time on multiple camera feeds or on individual camera feeds. Users can also see the total count of Objects 706 that are recognized, for example, by an Object Counting Algorithm and tallied up in the Object Recognition Counter 704. Additionally, users may be able to initiate one or more Object Recognition Algorithm(s) through the graphical user interface from 2D or 3D devices. Additionally, the Video Stream(s) Feed 700 can be displayed as and accessed via a Data Tile 532 in the Collaboration Space 560.

Figure 8:
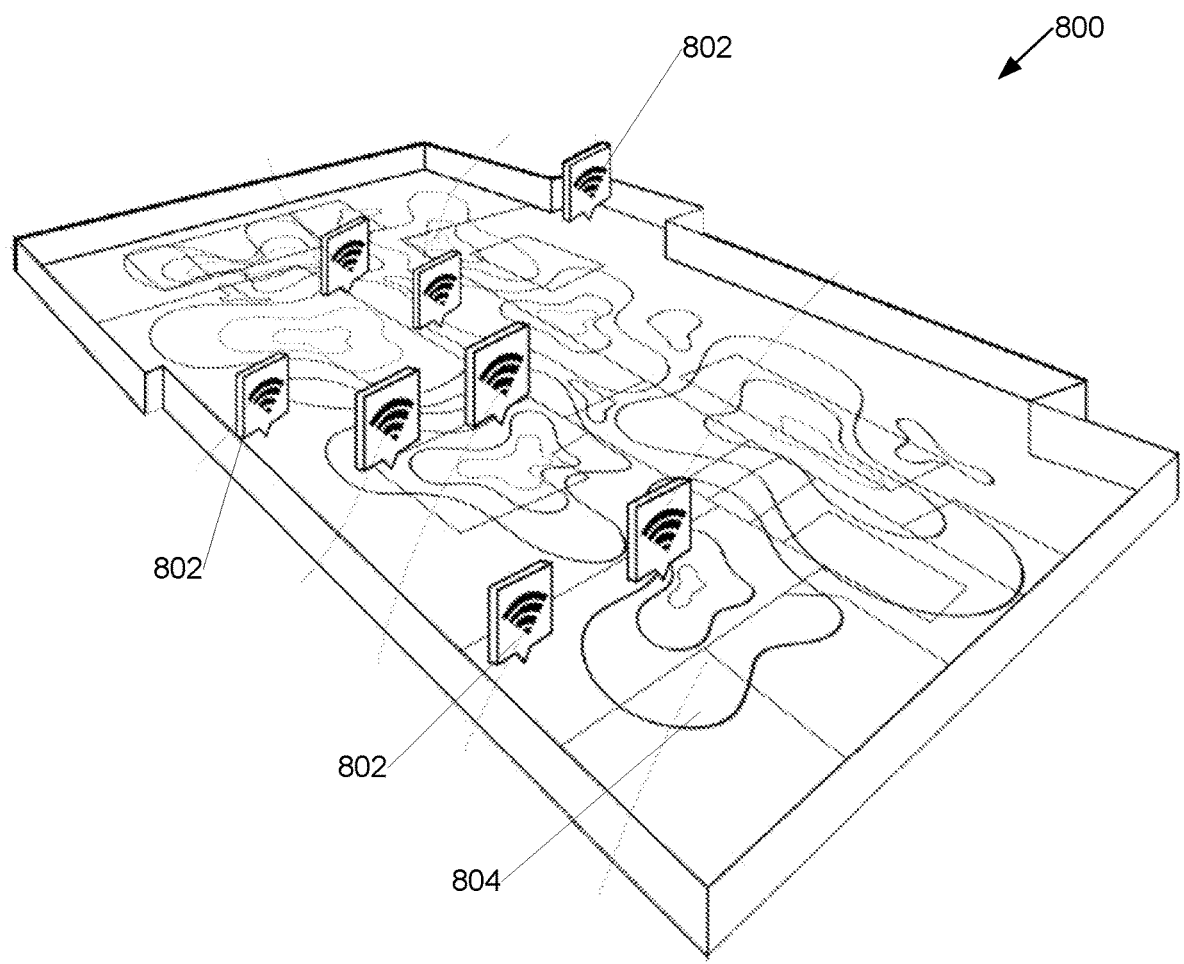
FIG. 8 illustrates an example Digital Building Replica according to an embodiment of the invention.

FIG. 8 illustrates an example Digital Building Replica 800. In the illustrated embodiment, the digital building replica 800 is shown as a replica of a physical structure. The digital building replica 800 can also be displayed in 2D or 3D by activating a Data Tile 532 in Collaboration Space 560. The digital building replica 800 advantageously shows one or more Network Devices 802 that may represent, for example, one or more IoT Device(s) 360. The network devices 802 may also represent any type of device, for example, industrial controllers, access points, switches, routers, servers, applications, cameras, sensors, computer clusters, phones, laptops, desktops, people, aerial vehicles, maritime vehicles, land vehicles, UAV's, weapon systems, spacecrafts, or any object or individual. The Digital Building Replica 800 advantageously shows physical characteristics of the building and includes an overlay of Network Devices 802 within the building. In the illustrated embodiment, the number of Network Devices 802 connected to Network 350 may be analyzed and visualized to generate the corresponding 3D Heatmap 804. The 3D heatmap 804 may be updated in real time or played back historically to show the flow of Network Device(s) 802 (and their corresponding users) throughout the Digital Building Replica 700. Additionally, the 3D Heatmap 804 can, for example, be based on the amount of data flowing through the Network Device(s) 802. The 3D Heatmap 804 can be generated based on other variables too and may include a mapping of the Network Devices 802 that dynamically generates the 3D Heatmap 804. In one aspect, the 3D heatmap 804 or its components may be changed by a user by using the Control Panel 900 in Collaboration Space 560 as previously described. Additionally, the Digital Building Replica 700 can be displayed as a Data Tile(s) 532 in the Collaboration Space 560.

Figure 9:
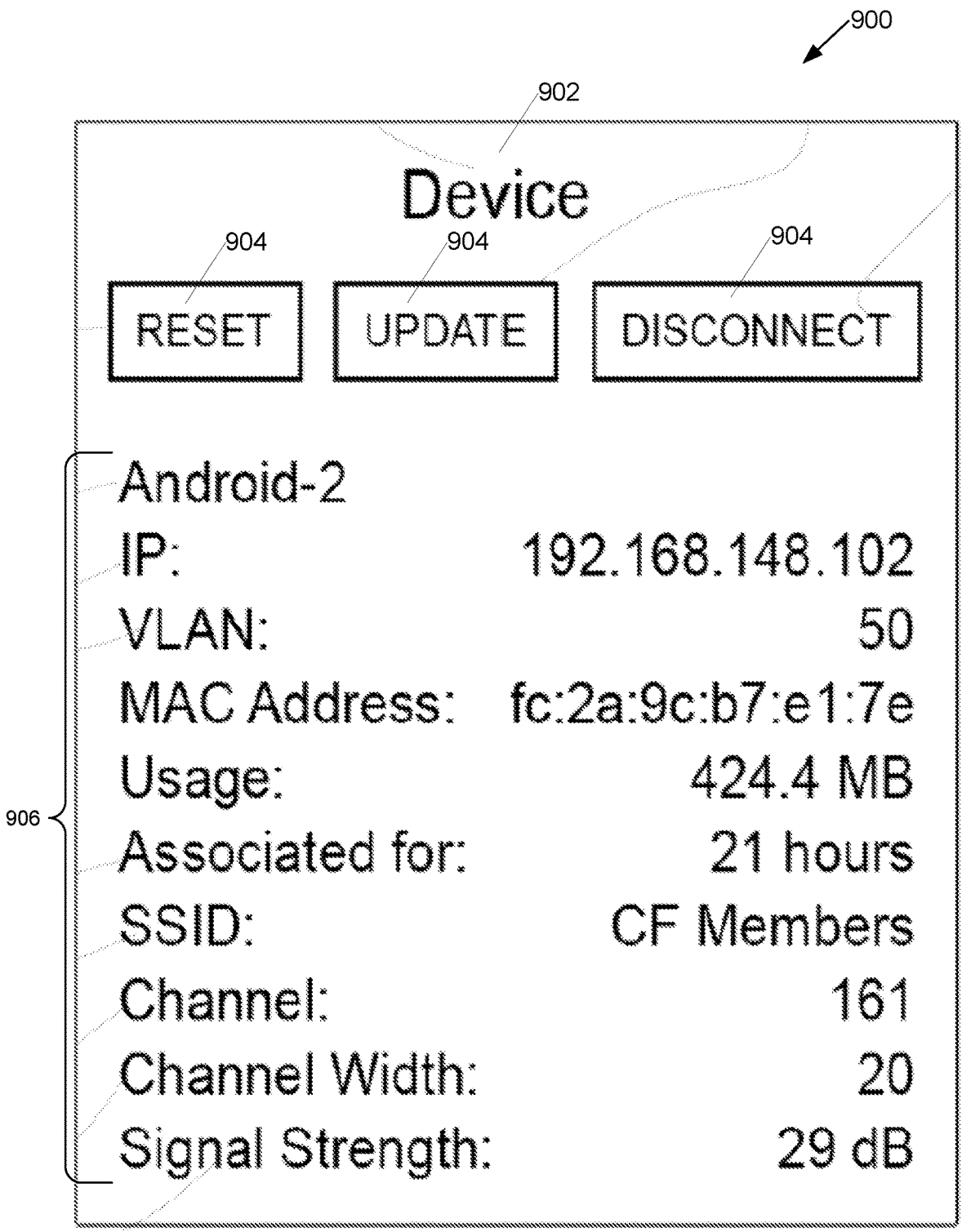
FIG. 9 illustrates an example 2D/3D graphical user interface of a Control Panel according to an embodiment of the invention.

FIG. 9 illustrates an example 2D/3D graphical user interface of a Control Panel 900. The control panel 900 can be activated to present additional detailed information called Data Variable(s) 902 that may include, for example, any variable from the Node Matrix 432 in the Key-Value Data Repository 430 or one or more Data Variable(s) 902 from, for example, one or more Data Sources 410. In the illustrated embodiment, Control Options(s) 904 may include, for example, device resetting, device system updating, device management, device disconnection, device firmware management, application management, virtual machine management, IoT device management, camera management, server management, weapon system management, industrial control system management, aircraft management, network management, cloud management, robot management, automation management, vehicle management, and any device management. Such devices may be accessible via the Network 350. Users can monitor and visualize systems using the Control Panel 900 of one or more Graph Node(s) 501 and Graph Edge(s) 502. Network Device(s) 802 and/or any IoT Device 360 may be accessed via the Collaboration Space 560, e.g., a 2D rendering of the collaboration space 560, or a 3D rendering of the collaboration space 560. The Control Panel 900 is provided from the same global network map maintained by the Server 320 to allow a user to collaborate and monitor, manage and update one or more Network Device(s) 802 using the Control Panel 900.

Figure 10:
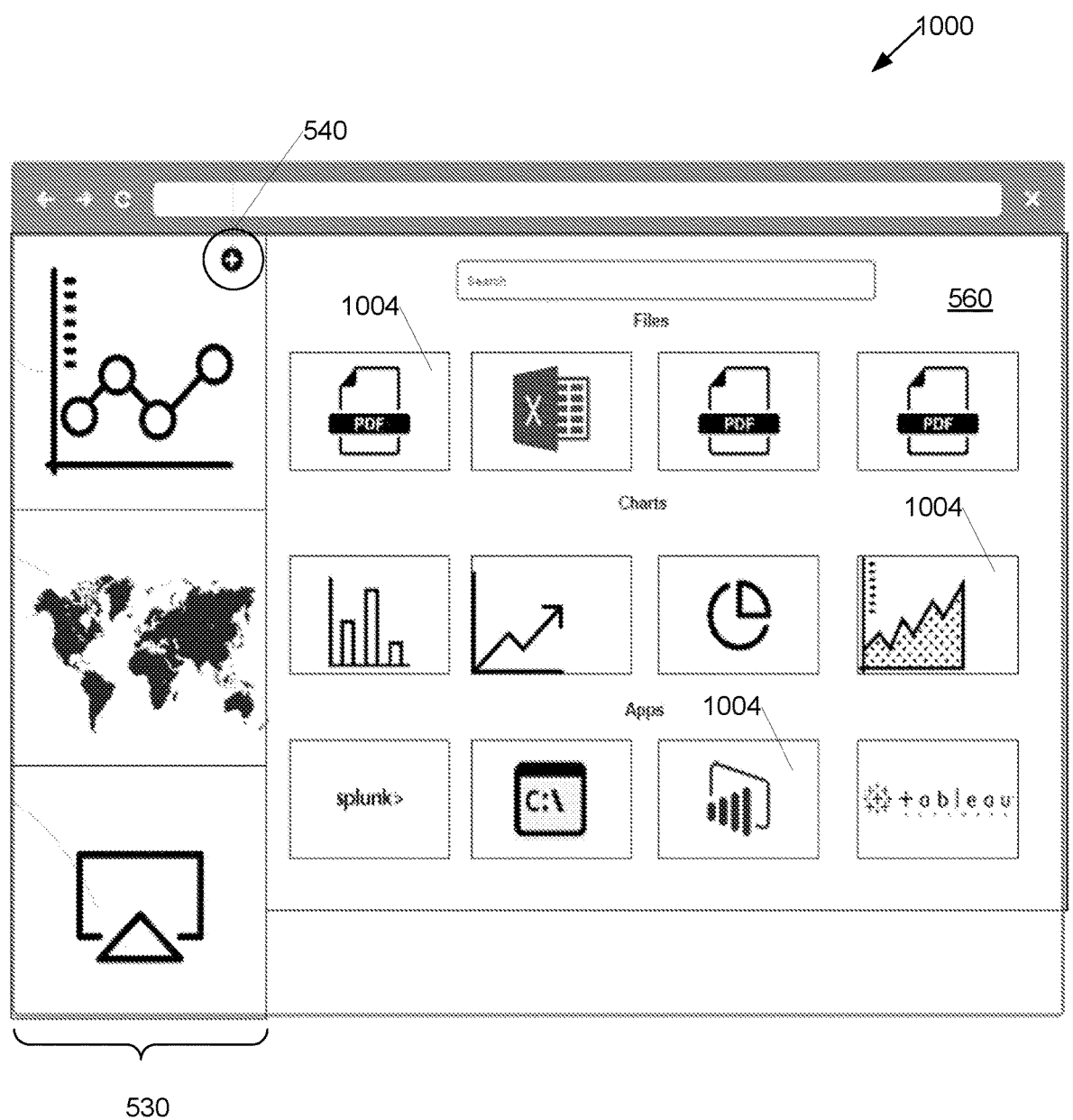
FIG. 10 illustrates a 2D graphical user interface 1000 according to an embodiment.

FIG. 10, illustrates a 2D graphical user interface 1000 according to an embodiment. File Share 540 is shown inside Collaboration Space 560 an may be presented in either the 2D environment within the collaboration space 560. The File Share 540 may include, for example, any Network Topology Graph 600 a, Video Stream(s) Feed 700, Digital Building Replica 800, or any Data Tile(s) 532. The File Share 540 within the 2D graphical user interface 1000 conveys file storage information to a user provided from the same global network map maintained by the server 320 and can access and provide any file on the File Server 460. Users can dynamically share files and Data Tiles 532 with other users in a Collaboration Space 560, whether the collaboration space 560 is rendered in a 2D or a 3D environment.

Advantageously, this facilitates real-time and dynamic file sharing and interchangeable Data Tile(s) 532 while also monitoring and managing one or more networks.

Figure 11:
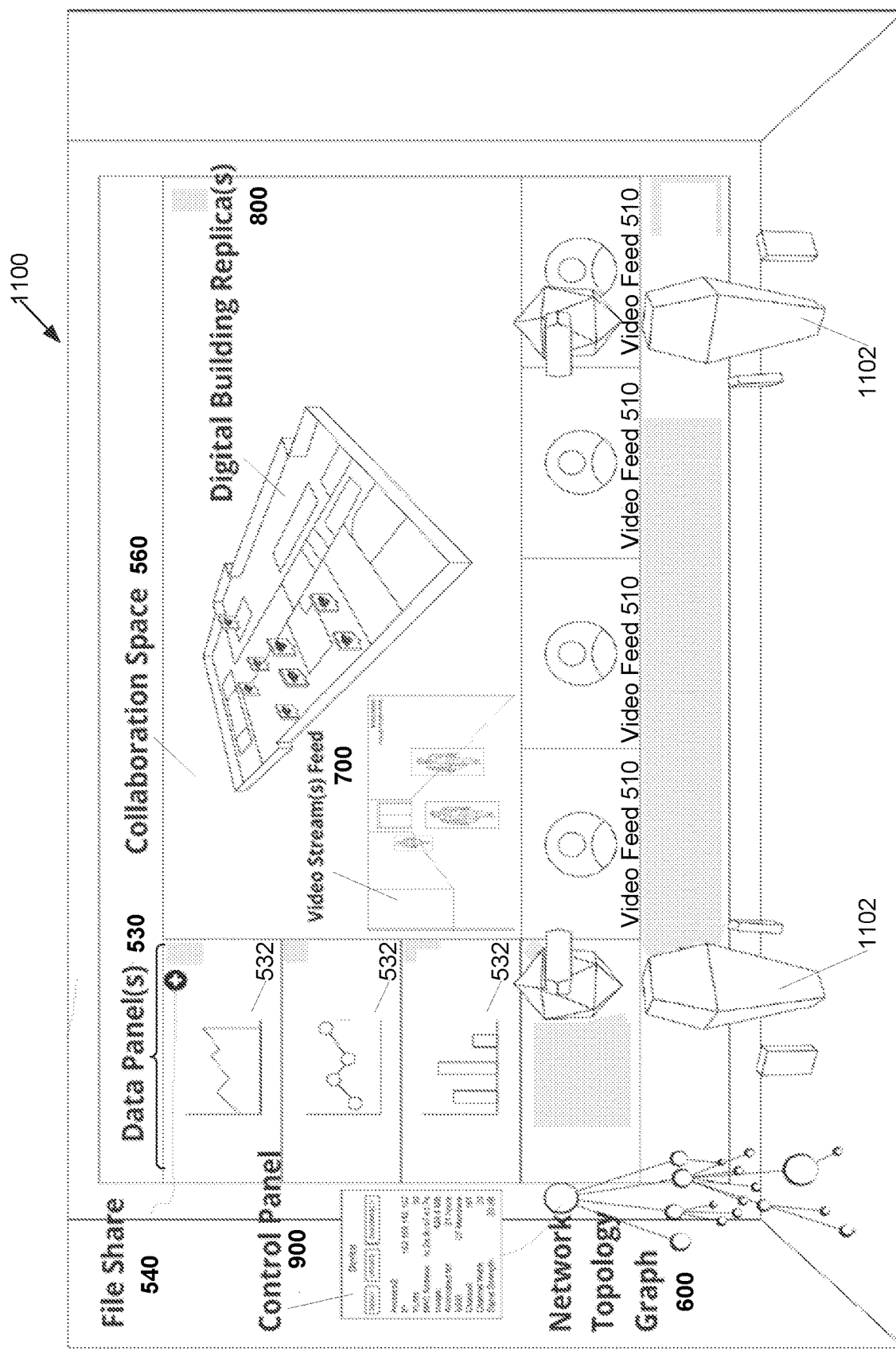
FIG. 11 illustrates an example 3D Environment 1100 according to an embodiment.

FIG. 11, illustrates an example 3D Environment 1100 according to an embodiment. The 3D environment 1100 allows users to manage and control one or more networks and services in the 3D Environment 1100 using the Control Panel 900. The 3D environment 1100 also allows users to communicate with other users from one or more Collaboration Spaces 560 by way of 3D Avatars 1102. Within the 3D Environment 1100, users may have access to, for example, one or more of the File Share 540, Control Panel 900, Data Panels 530, Data Tiles 532, Digital Building Replica(s) 800, Network Topology Graph 600, Video Stream(s) Feed 700, Video Feed 510, Audio Call 506, a 2D/3D web-based or local application based Spectator 508, and any other features and functionality previously described with respect to FIGS. 3-10 or contemplated as being helpful within the system 300. Users in the 3D Environment 1100 can also access File Share 540 using the File Server 460 or manage any Network Device 802 that is connected to the same global network map. Users in the 3D Environment 1100 can dynamically share files and Data Tiles 532 with users in one or more Collaboration Spaces 560, allowing for real-time and dynamic file sharing and interchangeable Data Tile(s) 532 while also monitoring and managing one or more networks.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A technical system for collaboration using a 3D user interface, the system comprising:
   - a server comprising at least one processor communicatively coupled with at least one non-transitory computer readable medium, the server connected to a first data communication network;
   - a virtual machine deployed on a device connected to a second data communication network having one or more endpoint devices, the virtual machine communicatively coupled with the server via the first data communication network;
   - wherein the virtual machine is configured to analyze network traffic from the second data communication network and generate a local map of endpoint devices connected to the second data communication network based on the analysis of network traffic and automatically provide the local map of endpoint devices to the server on a periodic basis, and wherein the virtual machine is further configured to provide network data flow information from the second data communication network to the server;
   - wherein the server is configured to receive a plurality of local maps of endpoint devices from a plurality of virtual machines on a plurality of second data communication networks and generate a global map of endpoint devices comprising a plurality of local maps of endpoint devices;
   - wherein the server is configured to receive a plurality of requests from a plurality of end user devices and analyze each request to determine one or more characteristics of each requesting end user device and provide a 3D user interface comprising the global map of endpoint devices based on the one or more characteristics of the corresponding end user device; and
   - wherein the 3D user interface includes a collaboration space having one or more data tiles and a network topology graph.

2. The system of claim 1, wherein the server simultaneously provides the 3D user interface to a first end user device and the 3D user interface to a second end user device for collaboration on management of the endpoint devices in the global map of endpoint devices, wherein the 3D user interface includes a first avatar corresponding to a user of the first end user device and a second avatar corresponding to a user of the second end user device.

3. The system of claim 1, wherein the 3D user interface also includes one or more data tiles configured to generate network management information and present the network management information within the 3D user interface.

4. The system of claim 1, wherein the network topology graph comprises one or more nodes, wherein a first node corresponds to a first endpoint device and the first node is configured to generate a first control panel having information corresponding to the first endpoint device and present the control panel within the 3D user interface.

5. The system of claim 1, wherein the network topology graph comprises one or more edges, wherein a first edge corresponds to a first network segment between a first endpoint device and a second endpoint device and the first edge is configured to generate a first control panel having information corresponding to the first network segment and present the control panel within the 3D user interface.

6. The system of claim 1, wherein the collaboration space comprises a video stream feed comprising live video and wherein the collaboration space comprises an overlay identifying a number of objects identified within the video stream feed.

7. The system of claim 6, wherein the collaboration space comprises a plurality of video stream feeds and wherein the collaboration space comprises an overlay identifying an aggregate number of objects identified within the plurality of video stream feeds.

8. The system of claim 7, wherein the network topology graph comprises a node corresponding to a camera generating the live video stream feed and the node is configured to generate a first control panel having information corresponding to the camera and present the control panel within the 3D user interface.

9. The system of claim 8, wherein the control panel comprises one or more control elements configured to tilt, pan, or zoom the camera.

10. The system of claim 1, wherein the network topology graph comprises at least two graph nodes connected by at least one graph edge representing a metadata connection between the at least two graph nodes.

11. The system of claim 1, wherein the network topology graph comprises at least two graph nodes connected by at least one graph edge representing a social relationship between the at least two graph nodes.

12. The system of claim 1, wherein the network topology graph comprises at least two graph nodes connected by at least one graph edge representing a network strength between the at least two graph nodes.

13. The system of claim 1, wherein the network topology graph comprises at least two graph nodes connected by at least one graph edge representing an image similarity between the at least two graph nodes.

14. A technical system for collaboration using a user interface, the system comprising:
- a server comprising at least one processor communicatively coupled with at least one non-transitory computer readable medium, the server connected to a first data communication network;
- a plurality of virtual machines, each deployed on a device connected to a second data communication network having one or more endpoint devices, each of the plurality of virtual machines communicatively coupled with the server via the first data communication network;
- wherein a first virtual machine is configured to analyze network traffic from its respective second data communication network and generate a first local map of endpoint devices and provide the first local map of endpoint devices to the server, and provide network data flow information from its respective second data communication network to the server;
- wherein a second virtual machine is configured to analyze network traffic from its respective second data communication network and generate a second local map of endpoint devices and provide the second local map of endpoint devices to the server, and provide network data flow information from its respective second data communication network to the server;
- wherein the server is configured to receive the first local map of endpoint devices from the first virtual machine and receive the second local map of endpoint devices from the second virtual machine via the first data communication network and generate a global map of endpoint devices comprising the first local map of endpoint devices and the second local map of endpoint devices;
- wherein the server is configured to receive a plurality of requests from a plurality of end user devices and analyze each request to determine one or more user interface characteristics of each requesting end user device and provide a user interface of the global map of endpoint devices based on the one or more user interface characteristics of the corresponding end user device; and
- wherein the user interface includes a collaboration space having one or more data tiles and a network topology graph comprising at least two graph nodes representing at least two endpoint devices connected by at least one graph edge representing a network connection between the at least two endpoint devices.

15. The system of claim 11, wherein the at least one graph edge represents a metadata connection between the at least two graph nodes.

16. The system of claim 11, wherein the at least one graph edge represents a social relationship between the at least two graph nodes.

17. The system of claim 11, wherein the at least one graph edge represents a network strength between the at least two graph nodes.

18. The system of claim 11, wherein the at least one graph edge represents an image similarity between the at least two graph nodes.

19. A technical system for collaboration using a 3D user interface, the system comprising:
- a server comprising at least one processor communicatively coupled with at least one non-transitory computer readable medium, the server connected to a first data communication network;
- a virtual machine deployed on a device connected to a second data communication network having one or more endpoint devices, the virtual machine communicatively coupled with the server via the first data communication network;
- wherein the virtual machine is configured to analyze network traffic from the second data communication network and generate a local map of endpoint devices connected to the second data communication network based on the analysis of network traffic and automatically provide the local map of endpoint devices to the server on a periodic basis, and wherein the virtual machine is further configured to provide network data flow information from the second data communication network to the server;
- wherein the server is configured to receive a plurality of local maps of endpoint devices from a plurality of virtual machines on a plurality of second data communication networks and generate a global map of endpoint devices comprising a plurality of local maps of endpoint devices;
- wherein the server is configured to receive a plurality of requests from a plurality of end user devices and analyze each request to determine one or more characteristics of each requesting end user device and provide a 3D user interface comprising the global map of endpoint devices based on the one or more characteristics of the corresponding end user device; and
- wherein the 3D user interface includes a collaboration space having one or more data tiles and a network topology graph comprising at least a portion of the endpoint devices in the global map of endpoint devices.

* * * * *